June 4, 1940.  A. L. FIELD  2,203,565
BOAT
Filed July 24, 1939  3 Sheets-Sheet 1
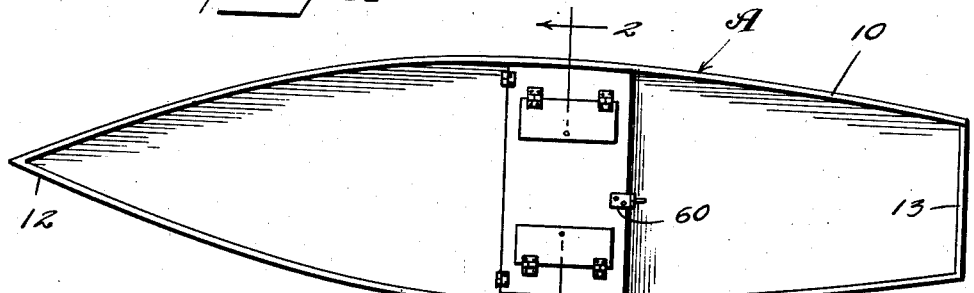
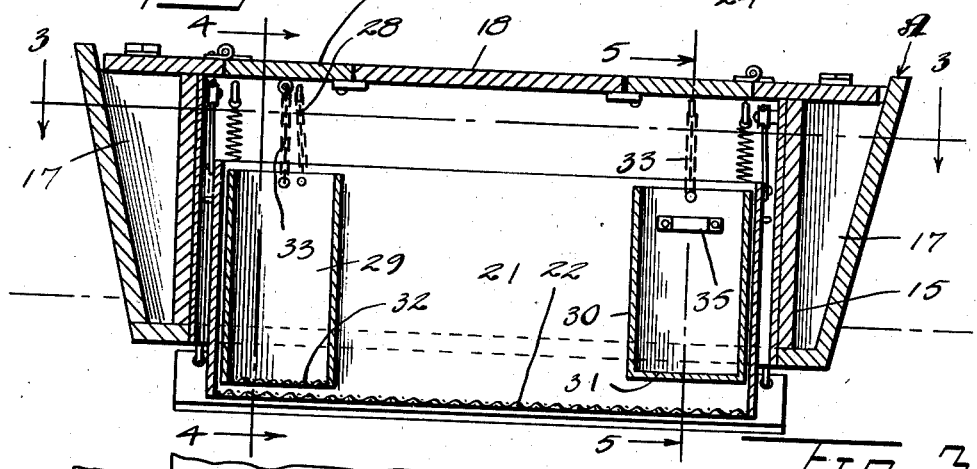
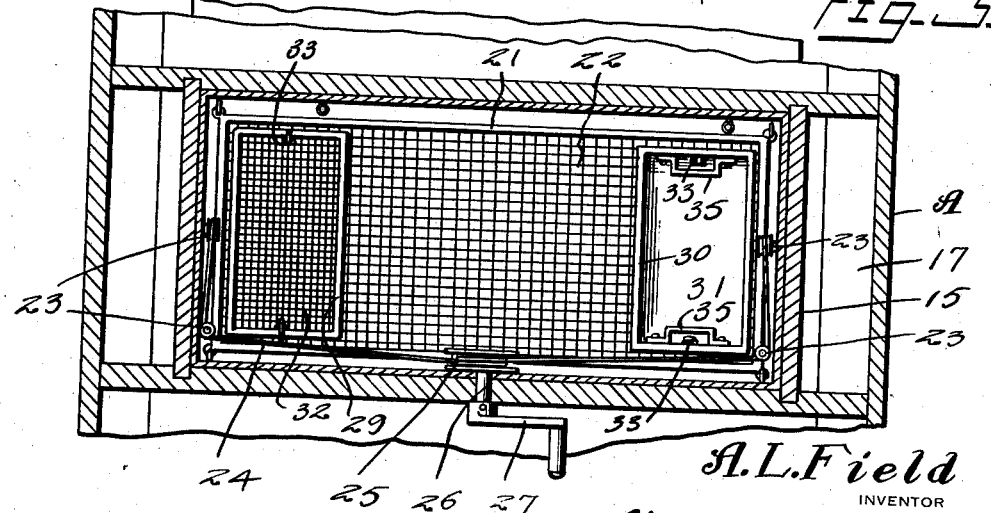
A. L. Field
INVENTOR
BY Victor J. Evans & Co.
ATTORNEYS June 4, 1940.　　　A. L. FIELD　　　2,203,565
BOAT
Filed July 24, 1939　　　3 Sheets-Sheet 2

A. L. Field
INVENTOR

Victor J. Evans & Co.
ATTORNEYS

June 4, 1940.   A. L. FIELD   2,203,565
BOAT
Filed July 24, 1939   3 Sheets-Sheet 3
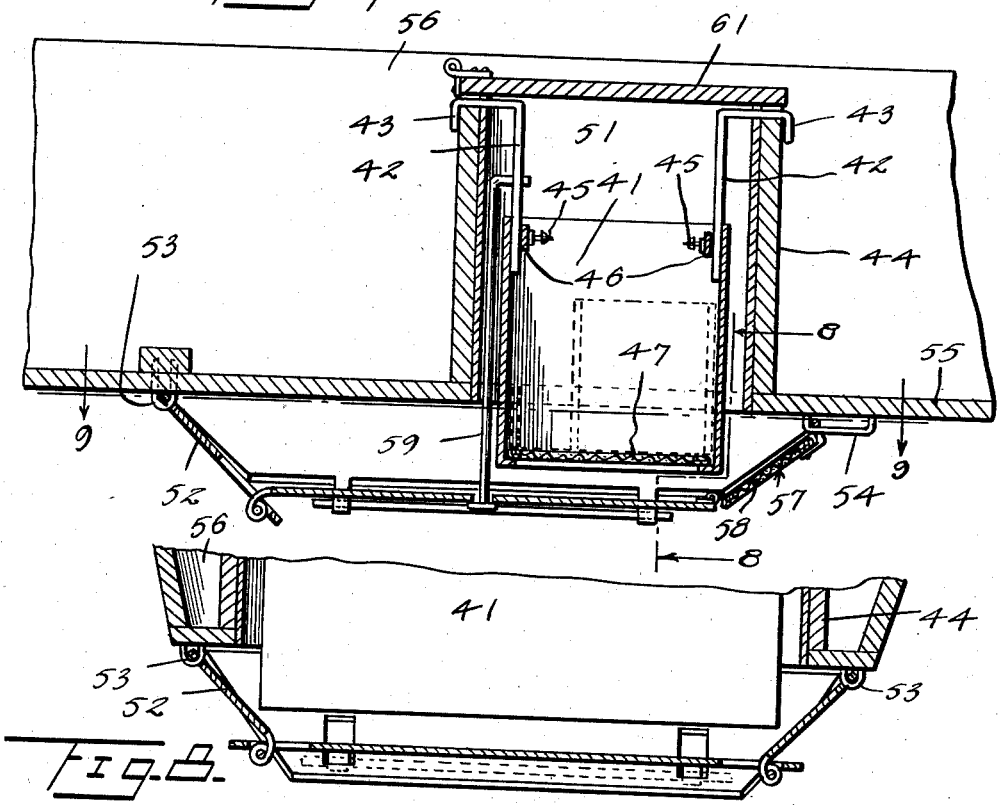
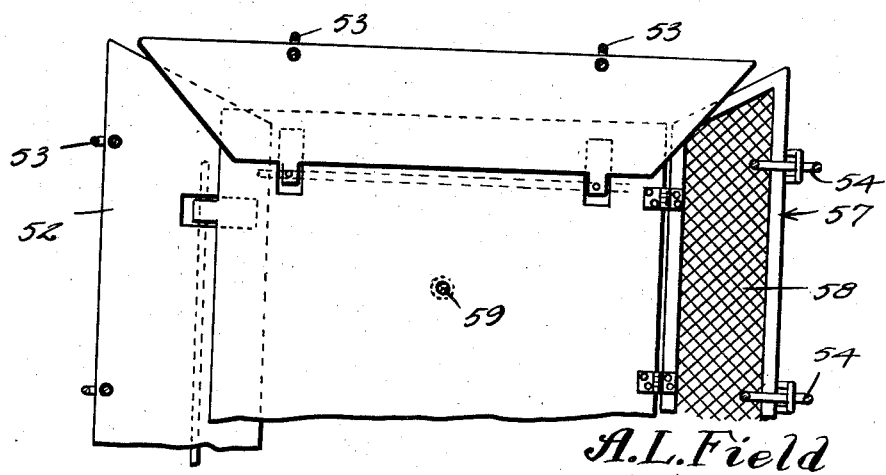
A. L. Field
INVENTOR
BY Victor J. Evans & Co.
ATTORNEYS Patented June 4, 1940

2,203,565

UNITED STATES PATENT OFFICE 2,203,565

BOAT

Alfred L. Field, Batavia, N. Y.

Application July 24, 1939, Serial No. 286,253

5 Claims. (Cl. 9—1)

The invention relates to a boat and more especially to a fishing boat.

The primary object of the invention is the provision of a boat of this character wherein its body is of the flat bottom type and amidship is arranged a seat forming therein a compartment or well having within a raising and lowering receptacle fitted with bait holders and this receptacle receives fish when caught and such receptacle is of a construction to assure a healthy condition to both the fish and the bait held within the holders.

Another object of the invention is the provision of a boat of this character wherein the bait holders are susceptible of being raised and lowered within the storage receptacle which is also adjustably suspended so that it can be lowered in the well for circulation of water therein without the water reaching a level for its flow into the body of the boat, the receptacle and the holders being readily accessible for the introducing of bait within the holders or the removal of such bait therein contained.

A further object of the invention is the provision of a boat of this character wherein the storage receptacle for the fish caught in the use of the boat is concealed from view being confined within a seat built within the body of said boat and this seat has a lid enabling easy access to the well or the receptacle therein, the bait holders being within the storage receptacle and are conveniently accessible at will.

A further object of the invention is the provision of a boat of this character wherein the receptacle for the storage of fish therein when lowered below the bottom of the boat to be partially submerged in water will be shielded so as to protect the fish contained therein from water impact and also avoids retarding the travel of the boat when afloat and being advanced in a body of water.

A still further object of the invention is the provision of a boat of this character wherein the storage receptacle has a reticulated bottom so that water can freely flow therein and circulate within for maintaining fish trapped therein in a healthy condition and alive, this being also true with respect to bait, particularly live bait contained within the holders therefor.

A still further object of the invention is the provision of a boat of this character which is simple in its construction, thoroughly reliable and efficient in operation, novel in construction, assured sanitary and inexpensive to manufacture.

With these and other objects in view, the invention consists in the features of construction, combination and arrangement of parts as will be hereinafter more fully described in detail, illustrated in the accompanying drawings which disclose the preferred and modified forms of the invention and pointed out in the claims hereunto appended.

In the accompanying drawings:

Figure 1 is a top plan view of a boat constructed in accordance with the invention.

Figure 2 is an enlarged sectional view taken on the line 2—2 of Figure 1 looking in the direction of the arrows.

Figure 3 is a fragmentary sectional view taken on the line 3—3 of Figure 2 looking in the direction of the arrows.

Figure 7 is a fragmentary vertical longitudinal sectional view through a modified form of boat construction.

Figure 8 is a sectional view on the line 8—8 of Figure 7 looking in the direction of the arrows.

Figure 9 is a sectional view on the line 9—9 of Figure 7 looking in the direction of the arrows.

Similar reference characters indicate corresponding parts throughout the several views in the drawings.

Figure 4:
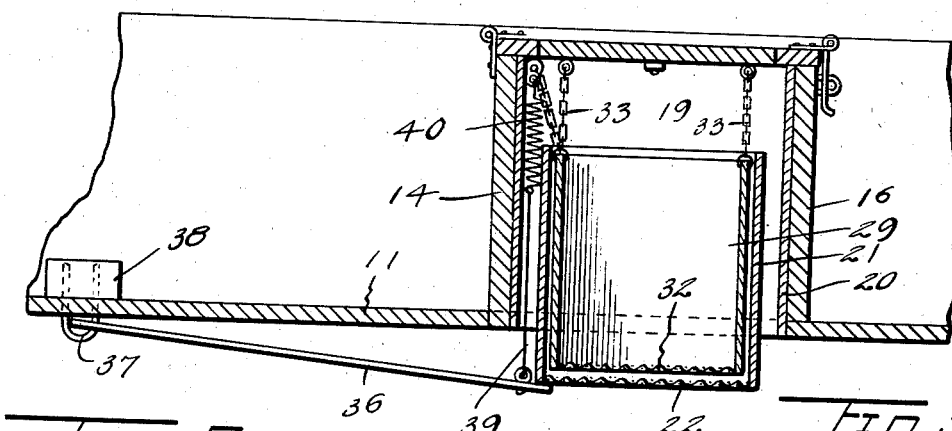
Figure 4 is a sectional view of the line 4—4 of Figure 2 looking in the direction of the arrows.

Referring to the drawings in detail, particularly Figures 1 to 6 inclusive, A designates generally the boat constructed in accordance with the invention and comprises a body 10, being the shell of the boat having a flat bottom 11, the shape of the said body or shell being conventional with a pointed bow 12 and a blunt or straight stern 13 respectively. Built within the body or shell 10 amidship is a seat frame 14 closed on all sides, the ends 15 of the said frame being interfitted with the opposite side walls 16. Between the ends 15 and the sides adjacent thereto of the body or shell 10 are pockets 17 for accommodating fishing materials or for any other purpose. The seat frame 14 opens through the flat bottom 11 of the body or shell 10 and the top of this frame is open, being closed by a hinged lid or cover 18 constituting the seat proper. This lid or cover 18 also closes the pockets 17 being extended from one side to the other of the body or shell of the boat A.

The seat frame 14 constitutes an open well 19 and the inner faces of the sides and ends of the said frame being provided with a metal lining 20 entirely covering the same.

Accommodated within the well 19 is a storage receptacle 21 for receiving fish caught by a user of the boat and has formed therewith a reticulated or wire mesh fabric bottom 22, the receptacle being susceptible of adjustment vertically so that it can be lowered from within the well 19 into a body of water on which the boat is afloat so that such water can circulate therethrough maintaining the fish trapped therein alive or in a healthy condition, the water being let in through the bottom 22 of said receptacle.

Properly arranged within the well 19 near the upper open end thereof are guide pulleys 23 having trained thereover raising and lowering cables 24, these being connected with a windless 25 for winding on and from the same. This windlass 25 has its arbor 26 suitably journaled in a side wall 16 of the frame 14 and has fixed thereto a hand crank 27 which is located outside of the well 19 for free access and on manipulation of such crank handle the receptacle 21 can be raised and lowered within the well 19. When the receptacle 21 is in a raised position easy access can be had thereto on the opening of the lid or cover 18.

Located within the receptacle 21 is a pair of bait holders 29 and 30 respectively, the latter having a permanently closed bottom 31 while the holder 29 has the reticulated or perforated bottom 32. The holders 29 and 30 are suspended by hanger chains 33, these being fastened thereto and to selected walls of the well 19, the fasteners being of a kind to allow ready removal of the holders 29 and 30 at will. The holders 29 and 30 are accessible through swinging doors 34, built in the lid or cover 18 and are directly over the points of location thereof. One of the holders is for worms while the other is for minnows, crabs, or other bait. The holder 30 has inside thereof loop handles 35 for convenient lifting of the said holder from within the receptacle 21.

Figures 5, 6:
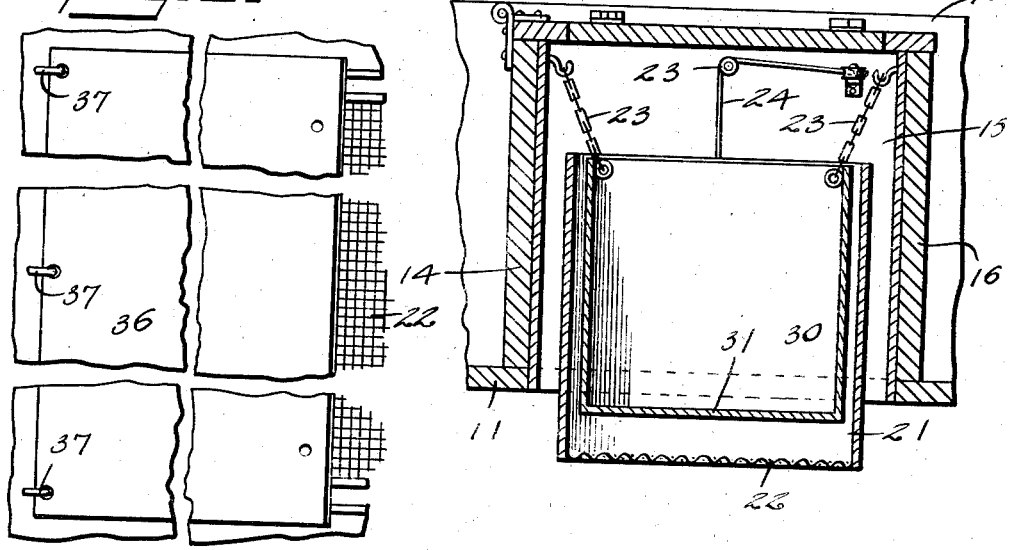
Figure 5 is a sectional view on the line 5—5 of Figure 2 looking in the direction of the arrows.
Figure 6 is a fragmentary bottom plan view.
Figure 10:
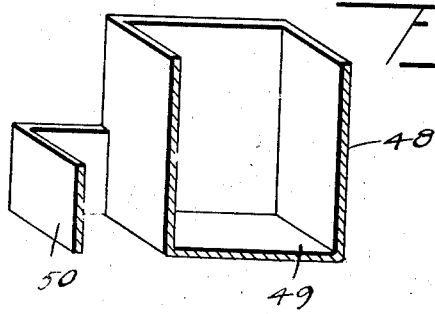
Figure 10 is a fragmentary perspective view of a bait box constituting a part of the modified form in Figures 7, 8 and 9.

Arranged below the bottom 11 of the boat body or shell 10 and forwardly of the well 19 is a shield or deflector plate 36, being loosely swung by staples 37 fixed in a cross beam or bar 38 built in the body or shell 10 and this shield or plate 36 extends rearwardly to underlie the receptacle 21 for a short distance while connected thereto through suspension rods 39 are coiled retractile springs 40 these being suitably attached in the well 19 and the purpose of these springs is to allow the plate or shield 36 to yield correspondingly to the lowering extent of the receptacle 21 as will be apparent from Figures 4 and 6 of the drawings. The shield or plate 36 protects the fish within the receptacle 21 from water impact and also relieves the boat from retardation in the travel thereof in a body of water. The shield or plate 36 makes contact with the flat bottom 11 of the shell or body 10 when the receptacle 21 is raised within the well 19 when at full elevated extent.

In Figures 7 to 10 inclusive of the drawings there is shown a modification of the invention wherein the storage receptacle 41 has adjustable connection with hanger brackets 42, these being releasably hooked at 43 to opposite sides 44 of the seat frame, the adjustment between the receptacle 41 and the said brackets 42 being had by set screws 45. The set screws 45 are fitted in guides 46 arranged within the receptacle 41. This receptacle 41 has a reticulated or perforated removable bottom 47 and resting thereon is a bait holder 48 including a permanently closed bottom section 49 and an open bottom section 50 respectively.

About the lowermost portion of the receptacle 41 and the lower open end of the well 51 is a sectional collapsible and extensible guard 52, the opposite side and end sections thereof being loosely attached at 53 and 54, respectively to the bottom 55 of the boat body or shell 56 and the aft section 57 of this guard 52 is equipped with a wire mesh or reticulated screen 58 so that water can circulate freely within the receptacle 41 and at the same time the latter will be protected from water currents or water impact which necessarily would injure live fish stored within said receptacle.

The guard 52 has connected thereto a lift rod 59 readily accessible through the open top of the well 51 so that said guard 52 can be collapsed against the flat bottom 55 of the boat body or shell 56 and held in this condition in any suitable manner when the receptacle 41 has been raised within the said well 51 to full elevated extent.

The guard 52 in its construction does not retard progress of the boat when traveling in a body of water and fully shields the receptacle 41 within the well 51.

The lid or cover 18 carries a latching hasp 60, this being also common to the lid or cover 61 for the seat frame 44. The hinged connections between the sections of the guard are such as to permit the extending or collapsing thereof.

What is claimed is:

1. In a boat the combination of a hull having a bottom formed to provide an opening of generally rectangular configuration, walls bounding said opening extending upwardly within the hull and attached to the hull and to each other to provide a well and securing means on the exterior of the bottom adjacent the opening; of a bait receptacle positioned in the well for movement outwardly thru the bottom of the boat and for retraction within the well, the receptacle including side walls corresponding to the walls forming the well and a recticulated bottom wall, cable means secured to the receptacle for retracting the same and additional retracting means constituting means at least partially shielding the receptacle from water currents, said additional means including plate means pivotally attached along one edge thereof to said securing means on the bottom of the boat and freely movable means suspending the opposite edge of said plate means under the receptacle thereby partially shielding the receptacle from water currents and at the same time urging the receptacle toward retracted position under impacts on the plate means.

2. In a boat, the combination of a hull having a bottom formed to provide an opening of generally rectangular configuration, walls bounding said opening extending upwardly within the hull and attached to the hull and to each other to provide a well and securing means on the exterior of the bottom adjacent the opening; of a bait receptacle positioned in the well for movement outwardly thru the bottom of the boat and for retraction entirely with the well, the receptacle including side walls corresponding to the walls forming the well and a reticulated bottom wall, retracting means for the receptacle, the retracting means comprising cable means attached to the receptacle and additional means resiliently urging the receptacle toward the retracted position, said additional means including a generally rectangular plate pivotally attached along one edge to the securing means on the bottom of the hull, the opposite edge of said plate underlying and bearing against an adjacent edge of the bait receptacle whereby pressure on the plate urges the bait receptacle toward retracted position and spring means biasing the last mentioned edge of the plate in an upward direction.

3. In a boat, the combination of a hull and a bait receptacle, the hull having a bottom formed to provide an opening of generally rectangular configuration, walls bounding the opening and extending upwardly within the boat to provide a well, the receptacle having walls corresponding to the walls of the well and a reticulated bottom, means for retracting the receptacle within the well, said receptacle being adapted to be positioned to move outwardly through the bottom of the boat, a plurality of series of spaced securing means on the bottom of the boat adjacent to and bounding the opening, each of the series being parallel to a different side of the opening, plates pivotally and slidably attached along an edge thereof to each of the series of securing means and another plate positioned under the opening in the bottom of the boat and pivotally attached along each of its edges to an edge of the first mentioned plates thereby protecting the receptacle at all times and urging the receptacle upwardly under impacts.

4. The combination as claimed in claim 3 including means secured to the additional plate for retracting the plates into engagement with the bottom of the hull.

5. The combination as claimed in claim 3 including at least one of the first mentioned plates provided with openings to admit water to the receptacle.

ALFRED L. FIELD.